United States Patent [19]
Shaw, Jr.

[11] 3,889,117
[45] June 10, 1975

[54] TAPERED DETECTOR SCANNING ARRAY SYSTEM

[75] Inventor: George W. Shaw, Jr., Cincinnati, Ohio

[73] Assignee: Cincinnati Electronics Corporation, Cincinnati, Ohio

[22] Filed: May 3, 1973

[21] Appl. No.: 357,881

Related U.S. Application Data

[63] Continuation of Ser. No. 138,456, April 29, 1971, abandoned.

[52] U.S. Cl. ............... 250/332; 250/334; 250/350; 250/578
[51] Int. Cl. ............................................. G01t 1/00
[58] Field of Search ........... 250/332, 334, 330, 350, 250/349, 578, 222, 223, 203, 342, 338; 73/355 R

[56] References Cited
UNITED STATES PATENTS

| | | | |
|---|---|---|---|
| 2,459,185 | 1/1949 | Sackville | 250/349 |
| 3,106,642 | 10/1963 | Shapiro | 250/350 |
| 3,708,666 | 1/1973 | Barhydt | 250/334 |

*Primary Examiner*—Harold A. Dixon
*Attorney, Agent, or Firm*—Lowe, King & Price

[57] ABSTRACT

The invention is an infrared radiation detector assembly utilizing sensing elements of unique design. The energy sensors are placed at the image plane of the optics and are made to sequentially scan the field of view on a repetitive basis. The detector elements consist of a linear array which may be rotated about its mid-point in a plane whose center is coincident with but perpendicular to the optical axis of the lenses, the elements of the array being progressively larger as they extend outwardly from the center thereof. The invention includes means for effectively scanning the image plane by creating relative movement between the optical system and the sensing elements and the visual display of the image by appropriate organization of electrical impulses derived from said elements.

14 Claims, 5 Drawing Figures

PATENTED JUN 10 1975　　　　　　　　　　3,889,117

SHEET　　1

INVENTOR.
GEORGE W. SHAW, JR.
BY Charles M. Hogan

ATTORNEY.

TAPERED DETECTOR SCANNING ARRAY SYSTEM

The present invention is a continuation of patent application Ser. No. 138,456 filed Apr. 29, 1971, of George W. Shaw, Jr., now abandoned, entitled "Tapered Detector Scanning Array System," assigned to the same assignee as said parent application and invention.

FIELD OF THE INVENTION

The invention relates to the art of detecting and utilizing infrared radiation to obtain useful information such as the presence of infrared rays emanating from specific objects or apparatus as well as the direction and speed thereof and to display such information in a fashion which can be easily understood and utilized.

BACKGROUND

Previous line-scanning infrared receivers have used a number of detector cells mounted in parallel with the discrete detector elements being all of the same size. In most equipments a raster scan of the viewed scene has been provided by moving the optical lenses, rotating a mirror, turning wedge-shaped transparent elements, or in other ways diverting the path from the image plane through to the front of the optics. Using the prior art, a 0.5 radian vertical field of view would require use of a 500 line scanner to achieve a resolution of 1 milliradian. One resolution element of .001 radian times 500 lines equals 0.5 radian. To obtain a frame rate of 30 per second means then it would be necessary to scan 30 × 500, or 15,000 lines per second. If it were practical to mount an array of 500 detectors in a dewar, it would be possible to scan a whole frame at a time but a repetition of the action 30 times a second would be required to obtain the desired rate of scan.

In an infrared system it is very expensive to construct such an elaborate arrangement.

SUMMARY OF INVENTION

The invention provides a linear array of relatively few detector elements bearing a specific size relationship to each other from which good resolution can be derived in the areas most easily observed by the human eye. In scanning a scene 0.5 radian high, the human eye cannot make use of the high resolution all the way across the field at a given instant. The eye has a very good resolving power over a 2° solid angle at the center of the field of view but less resolving power in an area 15° or 20° away from the optical axis. Moreover, optical lenses cannot be made to perform equally well all the way across a 30° angle without compromising the center-field or near axis resolution.

The invention is based on the principle that there is often no simultaneous need for a displayed 1 mil resolution across the entire 0.5 radian vertical field. Better matching for the capability of the human eye and the characteristics of the optics are provided with a 1 mil resolution at the center and a lesser degree of resolution at the edges.

As an example of this principle, and referring to a detector having the configuration of FIG. 1, let it be assumed that starting at the center and moving outward in both directions the elements 10 are made up as follows:

a. 50-1 mil cells
b. 26-2 mil cells
c. 18-3.5 mil cells
d. 17-5 mil cells

Total in each half equals 111 or 222 in the total array.

This array of 222 discrete cells will span the same 0.5 radian vertical field as do the 500 cells of equal 1 mil resolution each. However, when using a frame rate of 30 per second, the tapered array needs to scan data along only 6,660 lines per second as opposed to the 15,000 lines of the prior art approach.

A substantial saving in both electronic components and in the number of individual detector cells required is thus achieved. There may be a degradation in resolution at the frame edges, but there are still 100 of the 1 mil resolution cells at the center of the field where good resolution is of utmost importance. The gradual outward degradation of resolution will permit the detection of movement within the field of view. The provision of an electronic zoom will retain the 1 mil resolution, even when the display is expanded as much as five to one.

OBJECTS

Objects of the invention are to improve the accuracy and capability of discrete detector line scanning infrared radiation receivers and to improve the resolution, sensitivity and band width range compensation thereof. In accordance with the invention, the capability of such a receiver is measurably improved by reason of the discrete elements making up the array having a unique size relationship with respect to each other. In other words, the array is tapered from the center outwardly in each direction. The desired benefits are achieved in several ways.

First, operational band width requirements of the video processor are kept at a minimum.

Second, the results of scanning match the way in which the human eye functions, making it possible to obtain a good human engineering match between visual display equipment and the human operator.

Third, an electrical zoom capability can be achieved since there will always be a high resolution capability on and immediately adjacent to the optical axis. Multiple displays can utilize the electronic zoom without interfering with each other.

Other objects and advantages of the invention will more clearly appear when reference is had to the accompanying drawings.

BRIEF DESCRIPTION OF THE DRAWINGS

In the drawings are exemplary embodiments in which.

DETAILED DESCRIPTION

Figure 1:
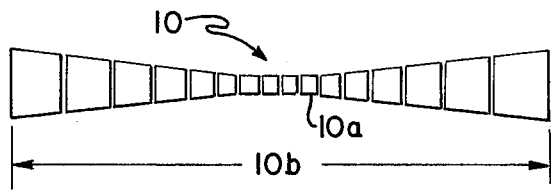
FIG. 1 is a plan view of a tapered detector array pattern.

Refering to FIG. 1, the array is preferably made up of a suitable base upon which are mounted a series of photo sensor elements 10, with very small elements in the area 10a and progressively increasing size from the center to the outer edges. The length of the array 10b represents the full field of view. The sensors are arranged linearly as are shown and are mounted for rotation in a selected direction as are indicated by the arrows. When such an array is rotated in the focus plane of an optical system and arranged so that the signals from each element are carried to a display device such as will hereinafter be described, the resolution capability of the discrete elements nearest the optical axis is better than those receiving optical signals displaced from the axis. It will be observed from FIG. 1 that, at the mid-point in the array, the size of each sensor element is made small compared to those which are used to scan the periphery of the scene. The actual geometry of the taper can be made a linear function, or can be made linear stepwise or by utilizing some other compound ratio of tangential width versus radial distance from the center.

Figure 2:
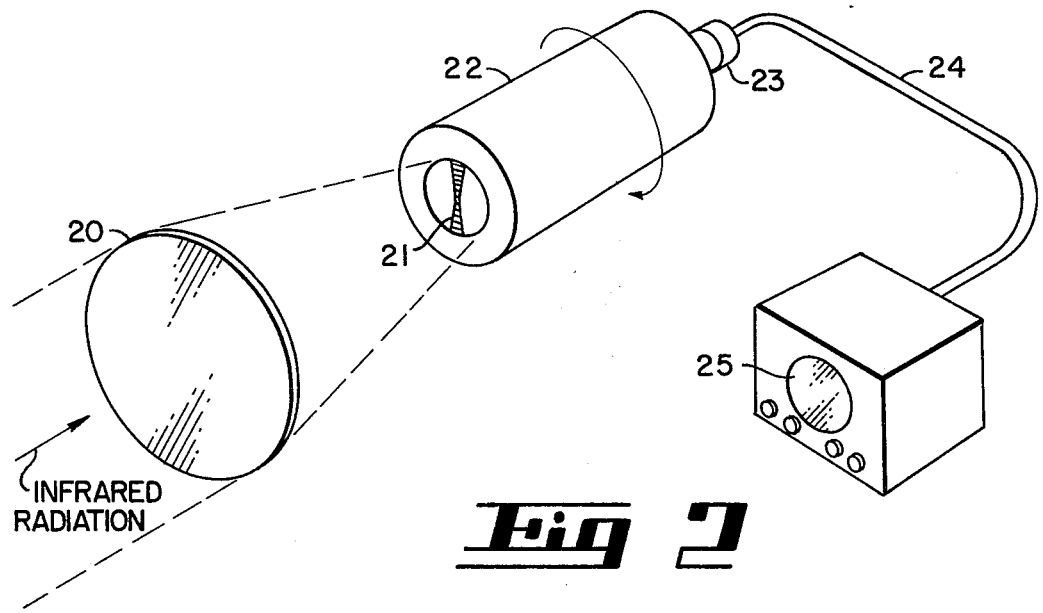
FIG. 2 is a diagrammatic view of a scanning infrared radiation receiver using the novel rotating tapered detector array of the invention.

In FIG. 2 I have shown diagrammatically a device in which infrared radiation is focused through a lens 20 upon the face of a tapered detector array 21, which is suitably mounted for radiation on a cylinder or disk 22 around the optical axis of the system. The elements of the detector are connected by conventional means, to slip rings 23 by permitting the electrical signals from the detector elements to be connected to conductors within cable 24, the ends of which conductors are connected to appropriate terminals within cathode ray tube 25. It will be observed that video information acquired by the detector is thus supplied to a display device.

Figure 3:
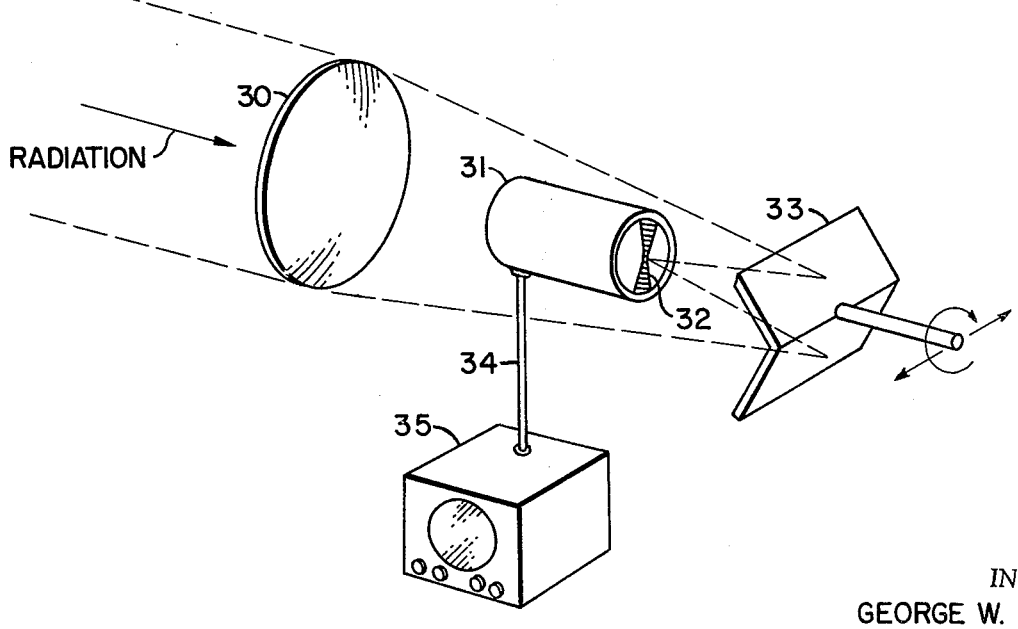
FIG. 3 is a diagrammatic view of an alternative receiver utilizing a moving mirror with a fixed tapered detector.

In FIG. 3 I have shown diagrammatically an alternative construction in which the sensor assembly is fixed and scanning is obtained by rotating mirrors. In FIG. 3 incoming radiation is focused by lens 30 upon a fixed member 31 in which a tapered array 32 is mounted, the member 31 being aligned axially thereof. The array 32 is thus positioned on the optical axis of the system but perpendicular thereto. Suitably mounted in the focal point of the optical system is a mirror device 33 arranged for rotation upon the optical axis as shown, the elements of the detector being connected through cable 34 to display device 35.

Figure 4:
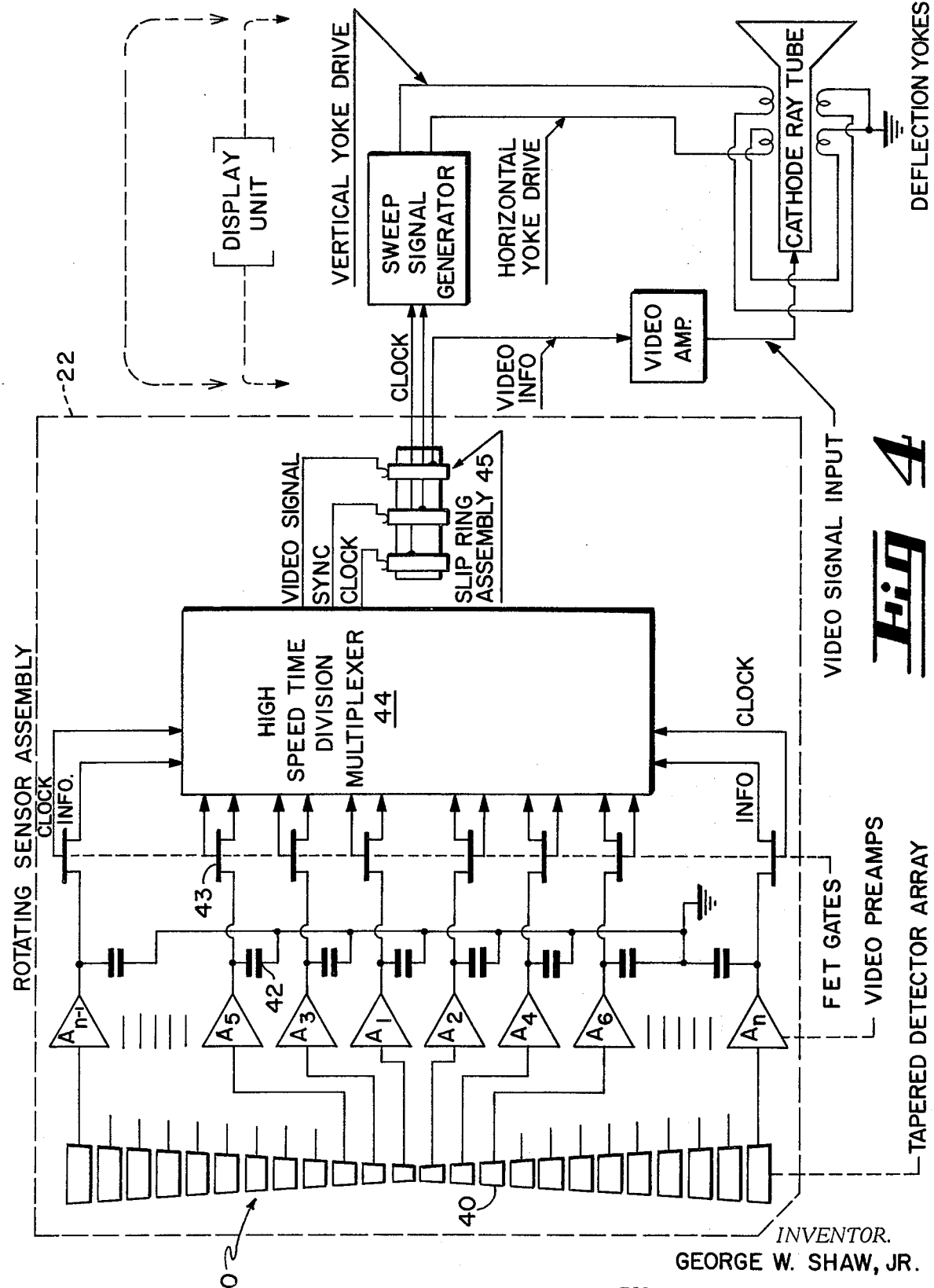
FIG. 4 is a diagram of a video signal processor and display unit incorporating the principles of the invention.

In FIG. 4 I have shown a diagram of illustrative electronics equipment and connections which can be used within the rotating sensor assembly 22 which is shown in FIG. 2. Each of the discrete elements 40 in the tapered detector array 10 connects to its own video preamplifier $A_n$. There are as many video preamplifier chnnels as there are detector elements. Preamplifiers of this type are available in integrated circuit form. The amplitude of the output of each of the amplifier channels is stored on a small capacitor 42. A high speed time division multiplexer 44 sequentially samples the voltage stored on each of the capacitors. This is accomplished by means of gates 43. A clock pulse, which is sent from the multiplexer, serves to open the FET gates.

A time division multiplexer of the type used in this implementation is common art. Such an assembly is shown in Fairchild Integrated Circuit Data Catalog 1970, p. 7 – 39. The output of the multiplexer is transferred via a slip ring assembly 45 to a cable which connects the rotating sensor assembly to a display unit. The slip ring assembly needs to transfer the clock signal, the frame sync signal and the video information in the manner shown in FIG. 4. The clock and the sync signals will be used in a sweep signal generator which is connected to the deflection yokes of the cathode ray tube. These signals are of the same general nature as the horizontal and vertical sweep signals of a television receiver. The video information is amplified to the appropriate level to drive the beam modulator circuit of the cathode ray tube.

Figure 5:
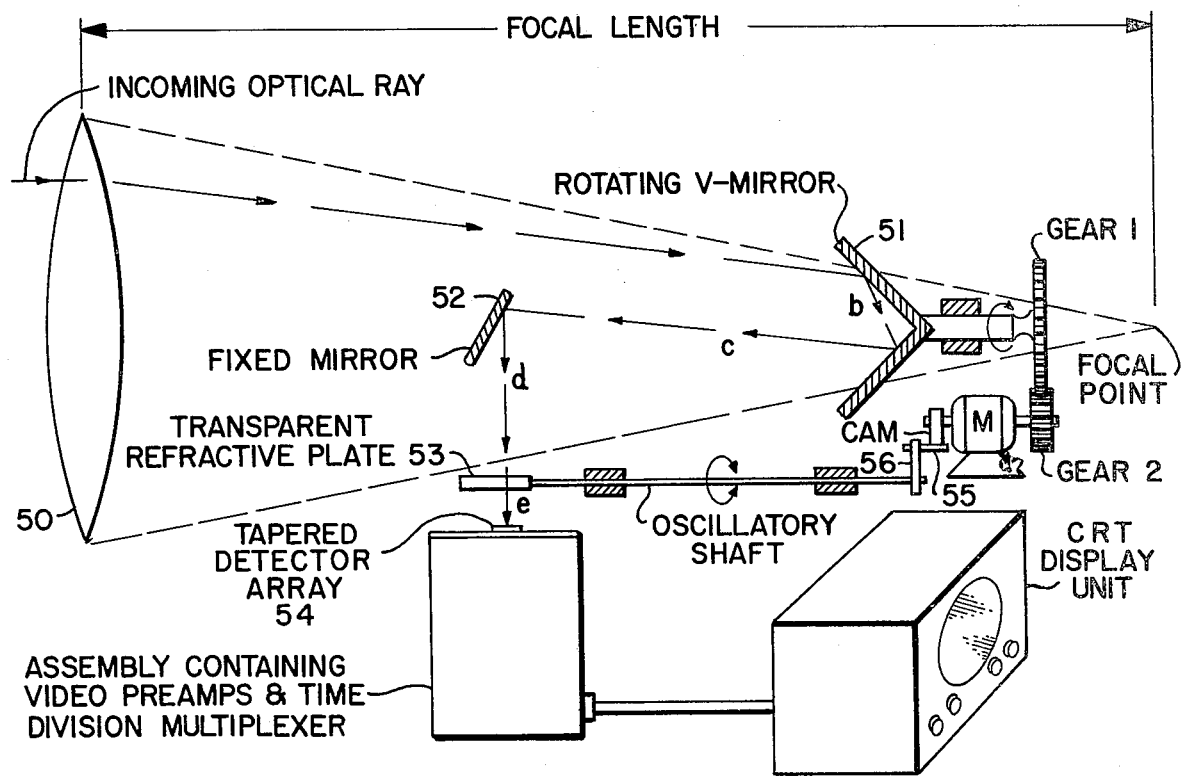
FIG. 5 is a diagrammatic representation of a scanning radiation receiver including means for further reducing the required number of detector channels by interlacing.

The system shown in FIG. 5 is an alternate implementation to that shown in FIG. 3. An incoming optical ray passes through the lens 50, strikes the rotating V-mirror 51, goes along the path shown as ray $b$ to the other side of the V-mirror, is reflected along path $c$ to a fixed mirror 52, which reflects the ray along path $d$, through a transparent refractive plate 53 to a tapered detector array 54. The small fixed mirror thus removes the bulky sensor assembly from the optical path. This tends to increase the efficiency of the lens.

The transparent refracting plate may be omitted. Its purpose is to provide an interlace scan. It does this by oscillating back and forth in a plane essentially perpendicular to the plane depicted in the figure. The means of making it oscillate as depicted is to use an eccentric cam 55 which operated against the crank 56. This dithers the plate. Its motion is synchronized with that of the rotating V-mirror. The rotating V-mirror provides a polar scan which sweeps out a 360° arc for every 180° travel of the V-mirror. Thus, for the device shown in FIG. 5, the ratio of gear 2 to gear 1 would provide a 2-1 reduction in the number of RPMs between the motor shaft and oscillating rate of the V-mirror shaft.

The electronics within the assembly containing the tapered array will be similar to that shown in FIG. 4 with the exception that the slip ring assembly is no longer required.

It should be noted that the tapered detector array is arranged at right angles to the plane of the paper as shown in FIG. 5. Further, the long dimension of the fixed mirror is also at right angles to the plane of the paper.

The purpose of the transparent refracting plate is to provide an interlaced type of scan. A ray entering from the fixed mirror will pass directly through the refracting plate when it is at right angles to the ray. If we now turn the refracting plate by a small angle, the ray coming from the fixed mirror will be shifted a slight amount, either fore or aft. By making the plate of an appropriate material and thickness it can be made to shift the optical rays by a half line width. This will then provide a good way for achieving interlace scan of the viewed scene.

Thus, without the refractive plate, the quipment shown in FIG. 5 will accomplish much the same task as that shown in FIG. 3. With the introduction of the refractive plate and the mechanical linkage we now have a means for accomplishing a complete interlace of scanning from one frame to the next.

DISCUSSION

The utilization of a tapered array such as shown in the figures provides several benefits. First, a multiresolution capability is achieved. The detector array consists of sensitive element sizes arranged in a pattern that approximates a taper. Second, the sensitive elements lie in the image surface of the receiver optical system. The projected image of the sensitive elements is caused to scan the desired field-of-view. The width of the sensitive element within the array in the direction of scan is varied to conform to a predetermined pattern. The widths typically range from narrow elements in the center or on one end of the array, increasing to wide elements at the opposite ends. Hence, there is apparent taper in the shape of the array. This width variation results in a range of resolutions within the scanned field-of-view.

This range of resolution has many useful features. It can be used to match an optical systems resolution, or a human operator's visual resolution, or a display system resolution. The variation in sensitive element width can also be effectively utilized in scanning radiation receivers to compensate for band-width differences and for sensitivity differences resulting from a particular receiver design or operational conditions. Display systems operating from a single multi-resolution receiver can be independently adjusted to magnify the narrow element portion of the field-of-view to effect an "electronic zoom" capability.

The invention can be used to advantage in both radiometers and radiation sensing receivers. While primarily intended for implementation in equipment designed for use at infrared wavelengths, there is foreseen to be additional applications in both the visible and ultraviolet portions of the spectrum.

The system of FIGS. 2 and 4 produce a real time image of the infrared radiation from a circular field of view. The length of the array and the focal length of the optical system determine the total field-of-view of the system. The size of each individual detector element determines the instantaneous resolution of that particular portion of the field-of-view.

Stated in another way, the present invention provides a system that has fine resolution in the center portion of the field-of-view and increasingly coarser resolution as one moves out from the center. An operator can view the displayed infrared radiation image on the display unit. Whenever an area of interest appears on the display, he can then aim the receiver system directly at the area of interest so that it is received by the narrow detector elements. The display can be adjusted in size so as to magnify the fine resolution picture of the area of interest.

In operation, the optical system focuses infrared radiation from its object field onto the plane in which a tapered detector array is placed. The detector array, spinning about the optical axis, sweeps out a circular field-of-view. Elements in the array vary in size, becoming larger (in a linear taper) near the outside edges. Instantaneous field-of-view increases from element to element, radially from the optical axis. For reasons of practicality, the central portion of the array has uniform size detectors each of which subtends the same instantaneous field-of-view as the smallest detector in the taper. It should be noted that the array of FIG. 1 is a sample tapered detector geometry with very few elements. The actual system envisioned uses a much greater number of detectors and tapers made more gradual or in steps by groups.

The detector signals are amplified, processed, passed through the slip rings, further processed, and finally displayed on a cathode ray tube. The result is a real time image of the infrared scene in the optics field-of-view. Position transducers sense the rotating sensor assembly's angular position and slave the cathode ray tube beam's angular location, thereby insuring an accurate representation of the scan field.

A control knob on the front panel of the display unit may be provided to expand the sweep in such a manner as to magnify the central portion of the field-of-view. The range over which this magnification is practical is determined by the ratio of the largest detectors size to the smallest detector size in the tapered array. This ratio is referred to as the zoom range of the system. This ratio can generally be much greater than is usually practical with an optical zoom system.

Several factors make the tapered detector array system a desirable receiver. Resolution is relatively fine in the center field-of-view and degrades toward the outside. This corresponds with the general behavior of optical systems making it possible to match detector and optical performances. All of the optics's near-axis resolvability can thus be utilized. Further off-axis, the number of detector elements is limited to that required to utilize available resolution of the optic.

Variable resolution is also of value in viewing the display. The human eye has fine resolution near the center of the field, degrading off center. By looking at the center of the tapered detector array display, an observer would, therefore, see the fine resolution portion with this fine resolution vision and the degraded resolution portion with his degraded resolution vision.

Another valuable feature of this design concept is realized when one uses multiple display units with a single receiver system. Each operator can choose a different field-of-view with its corresponding resolution without affecting the display of the other operator.

It should be noted that in the system of FIGS. 3 and 5 the detector is fixed relative to the optic and a mirror or a refracting prism element is moved in order to generate a scan pattern. The resulting scan pattern can be circular as in the previous example or can be a linear raster pattern such as in conventional television. The mirror can be either rotated about the optical axis to produce a rotating scan or oscillated perpendicular to the optical axis to produce a raster scan. In the raster scan system a bar of fine resolution information would be produced with gradually degrading resolution away from that bar.

The tapered detector array can also be used in scanning radiation receivers that do not employ a display. These receivers are often used as radiometers and work directly into signal processing units and recording units rather than into a display system. The principle of multi-resolution with a range of sensitivity, band-width compensation, and optical compensation still applies.

An interlace pattern can also be created where every other sensitive element is omitted. The scanning system must provide an alternate scan for an element to fill in the space left by the omitted elements. This is easily accomplished in the circular rotating systems with the elements on the opposite side of the array filling in the gaps left on the other side of the array. In a raster scanning system it is necessary to provide an optical deflection along the lengths of the array to fill in the gaps. It is not essential that the elements be arranged in a line. The pattern can be modified in various ways such as by placing the elements alternately on each side of the center of the array. The essential feature is that a portion of the field-of-view is covered by small-sized elements with an increase in sizes of the elements away from that portion.

While I have shown in the drawings a linear array, it will be understood that other configurations can be effectively used, such as a pair of arrays disposed parallel to each other and scanned sequentially.

Having thus described my invention, I claim:

1. An electro-optical system comprising a radiation sensitive detector array consisting of a series of discrete detector elements tapering outwardly from the midpoint to each end, means for scanning an optically focused scene on said array and means for electrically reproducing said scene on a display device wherein the tapering orientation of said elements is accomplished approximately in steps by providing one group of the smallest elements centrally of said array and progressively larger groups extending outwardly toward each end thereof.

2. An electro-optical scanning system having an optical axis comprising a radiation sensitive detector array including a series of discrete detector elements of different areas extending radially from the axis in a tapered manner, the taper and areas being arranged so that progressively larger area elements of the array are spaced farther from the axis than the smaller elements of the array, all elements of the array being located on a straight line intersecting the axis, means for scanning an optically focused scene on the array so that different portions of the scene are sequentially scanned across the elements of the array, and means for electrically reproducing said scene on a display device.

3. The system of claim 2 further including a separate amplifier for each of said elements, each of said amplifiers connected to be responsive to a signal derived from its associated element, means for storing the signal derived from each amplifier, and means for time division multiplexing the stored signals to a common output terminal.

4. The system of claim 3 wherein the display device has orthogonal deflection axes scanned in synchronism with the optical scanning means and the time multiplexing means, said display device having an intensity control responsive to the signal at the common output terminal.

5. An electro-optical scanning system having an optical axis comprising a radiation sensitive detector array including a series of discrete detector elements extending radially from the axis, said elements being arranged so that the resolution of the array is an inverse function of radial distance from the axis, all elements of the array being located on a straight line intersecting the axis, and means for scanning an optically focused scene on the array so that different portions of the scene are sequentially scanned across the elements of the array.

6. The system of claim 5 wherein the means for scanning includes means for optically turning the scene relative to the array about the axis.

7. The system of claim 6 wherein the means for turning includes an optical reflector for the scene, said reflector rotating about the axis.

8. The system of claim 7 wherein an interlace scan of the scene is provided and the means for scanning includes a transparent refractive plate oscillated about the axis in synchronism with rotation of the means for reflecting.

9. The system of claim 8 further including a separate amplifier for each of said elements, each of said amplifiers connected to be responsive to a signal derived from its associated element, means for storing the signal derived from each amplifier, means for time division multiplexing the stored signals to a common output terminal, and a display device having orthogonal deflection axes scanned in synchronism with the optical scanning means and the time multiplexing means, said display device having an intensity control responsive to the signal at the common output terminal.

10. The system of claim 6 wherein the means for turning includes means for turning the array about the axis.

11. The system of claim 10 wherein the array symmetrically extends along the line on both sides of the axis.

12. The system of claim 11 wherein the array includes detector elements of different areas radially extending in a tapered manner from the axis, the taper and areas being arranged so that progressively larger area elements of the array are spaced farther from the axis than the smaller elements of the array.

13. The system of claim 5 further including a separate amplifier for each of said elements, each of said amplifiers connected to be responsive to a signal derived from its associated element, means for storing the signal derived from each amplifier, and means for time division multiplexing the stored signals to a common output terminal.

14. The system of claim 13 further including a display device having orthogonal deflection axes scanned in synchronism with the optical scanning means and the time multiplexing means, said display device having an intensity control responsive to the signal at the common output terminal.

* * * * *